(12) United States Patent
Trovon

(10) Patent No.: US 11,746,872 B2
(45) Date of Patent: Sep. 5, 2023

(54) DIFFERENTIAL OF A MOTOR VEHICLE

(71) Applicant: ZF Friedrichshafen AG, Friedrichshafen (DE)

(72) Inventor: Davi Mendes Trovon, Sorocaba (BR)

(73) Assignee: ZF Friedrichshafen AG, Friedrichshafen (DE)

(*) Notice: Subject to any disclaimer, the term of this patent is extended or adjusted under 35 U.S.C. 154(b) by 95 days.

(21) Appl. No.: 17/436,108

(22) PCT Filed: Mar. 4, 2020

(86) PCT No.: PCT/EP2020/055673
§ 371 (c)(1),
(2) Date: Sep. 3, 2021

(87) PCT Pub. No.: WO2020/178324
PCT Pub. Date: Sep. 10, 2020

(65) Prior Publication Data
US 2022/0186819 A1    Jun. 16, 2022

(30) Foreign Application Priority Data

Mar. 6, 2019 (DE) .......................... 102019203015.7

(51) Int. Cl.
*F16H 48/32* (2012.01)
*F16H 48/22* (2006.01)
*F16H 48/08* (2006.01)

(52) U.S. Cl.
CPC .............. *F16H 48/32* (2013.01); *F16H 48/22* (2013.01); *F16H 48/08* (2013.01)

(58) Field of Classification Search
CPC ........... F16H 48/08; F16H 48/22; F16H 48/32
(Continued)

(56) References Cited

U.S. PATENT DOCUMENTS

| 3,229,550 A | 1/1966 | Nickell |
| 4,583,424 A | 4/1986 | von Hiddessen et al. |

(Continued)

FOREIGN PATENT DOCUMENTS

| DE | 3642503 A1 | 6/1988 |
| DE | 4330581 A1 | 3/1994 |

(Continued)

OTHER PUBLICATIONS

International Search Report and Written Opinion for PCT/EP2020/055673 dated Apr. 29, 2020 (13 pages; with English translation).

*Primary Examiner* — Leslie A Nicholson, III
(74) *Attorney, Agent, or Firm* — Kristin L. Murphy

(57) ABSTRACT

The disclosure relates to a differential of a motor vehicle, comprising a crown wheel and a differential casing connected thereto. The differential further comprises differential pinion gears arranged on differential pins, wherein the differential pins are connected to the differential casing. The differential comprises a first differential side gear, which is mounted on a first drive shaft for conjoint rotation, and a second differential side gear, which is mounted on a second drive shaft for conjoint rotation. The differential comprises a first plate stack, which is arranged axially with respect to the first drive shaft between the crown wheel and the first differential side gear, and a second plate stack, which is arranged axially with respect to the second drive shaft between the crown wheel and the differential casing. Force can be applied to one or both of the plate stacks by a switchable actuating device counter to the differential side gear associated with the particular plate stack.

15 Claims, 6 Drawing Sheets

(58) Field of Classification Search
USPC .......................................................... 475/86
See application file for complete search history.

(56) References Cited

U.S. PATENT DOCUMENTS

| | | | | |
|---|---|---|---|---|
| 4,679,463 | A * | 7/1987 | Ozaki | B60K 23/04 |
| | | | | 475/86 |
| 4,741,407 | A * | 5/1988 | Torii | B60G 17/0195 |
| | | | | 192/48.612 |
| 5,183,131 | A * | 2/1993 | Naito | B60K 23/0808 |
| | | | | 701/69 |
| 5,215,506 | A * | 6/1993 | Hara | F16H 48/08 |
| | | | | 475/86 |
| 5,595,214 | A * | 1/1997 | Shaffer | F16D 43/284 |
| | | | | 137/513.5 |
| 6,383,109 | B1 | 5/2002 | Hofer | |
| 8,460,149 | B1 * | 6/2013 | Chemelli | F16H 48/40 |
| | | | | 475/230 |
| 9,759,303 | B2 * | 9/2017 | Peura | F16H 48/08 |
| 10,119,579 | B2 * | 11/2018 | Gerhardt | F16D 41/28 |

FOREIGN PATENT DOCUMENTS

| | | | | |
|---|---|---|---|---|
| DE | 19600799 | A1 | 7/1996 | |
| DE | 19618495 | A1 * | 11/1996 | ............ F16H 48/08 |
| DE | 102008000449 | A1 | 9/2009 | |
| DE | 102011003221 | A1 | 8/2012 | |
| JP | S60256644 | A | 12/1985 | |
| JP | S6159044 | A | 3/1986 | |
| JP | 2010190238 | A | 9/2010 | |

* cited by examiner

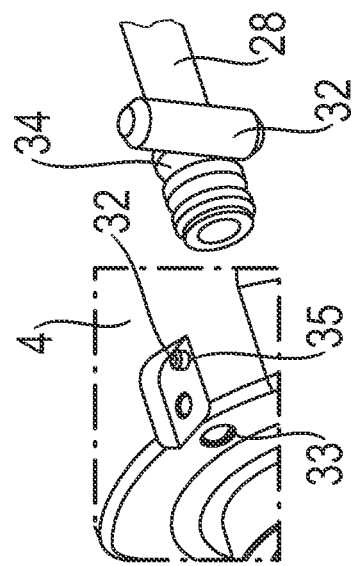
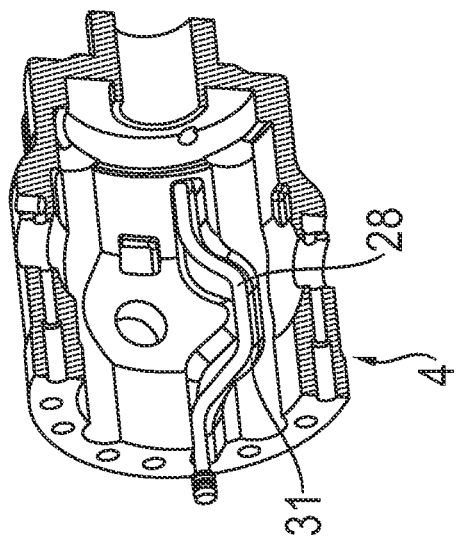
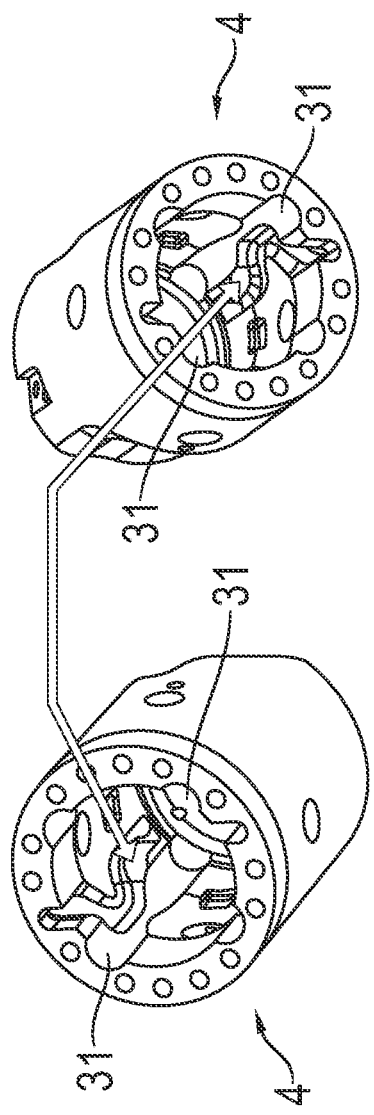

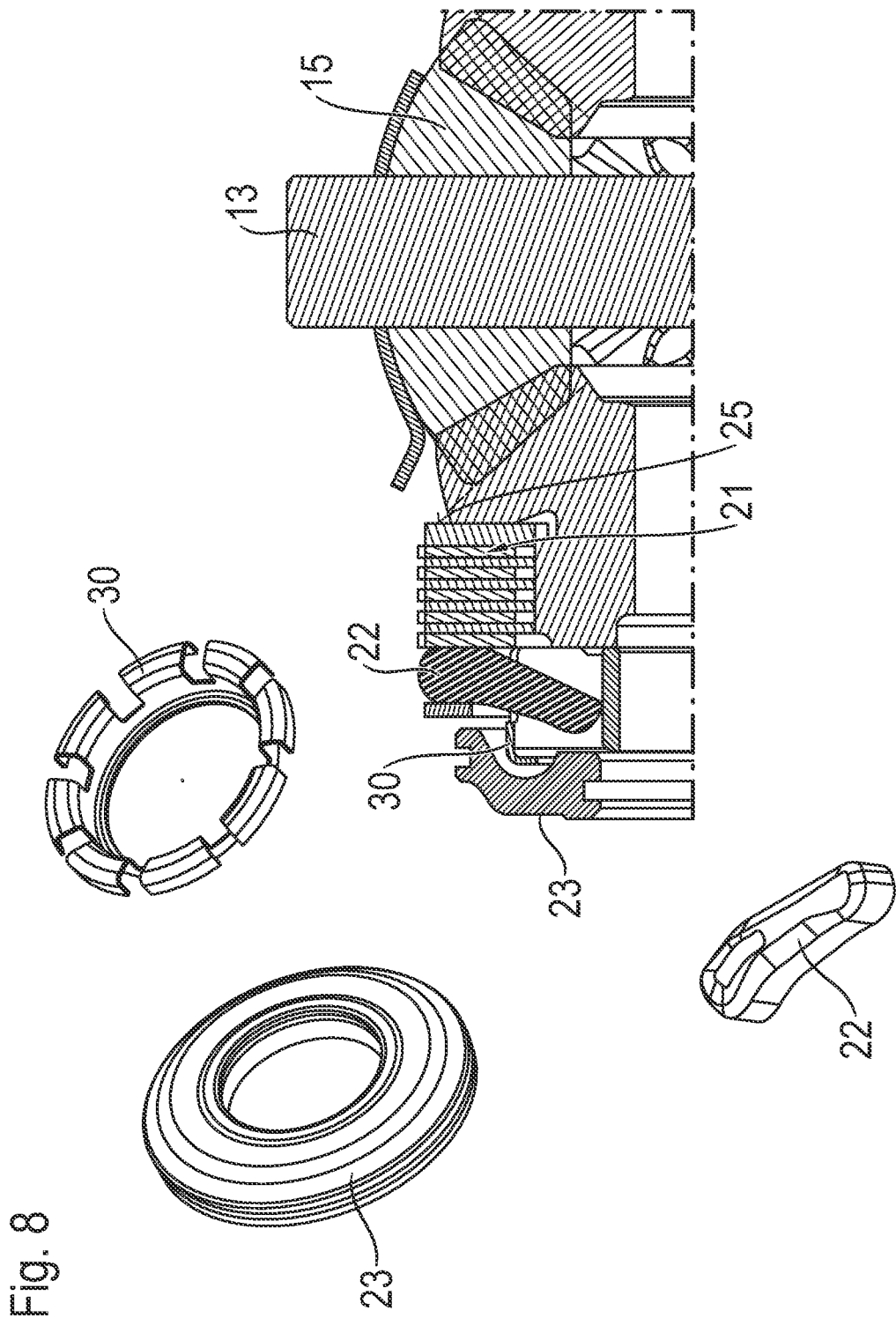

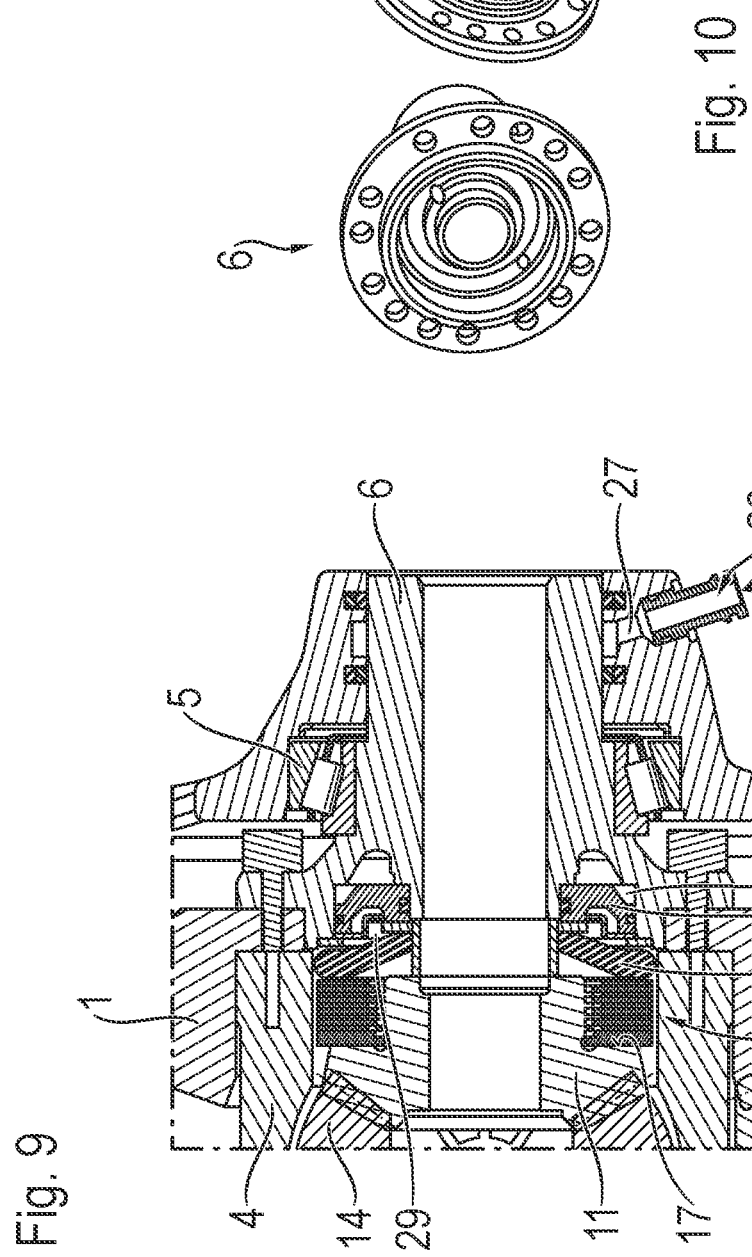

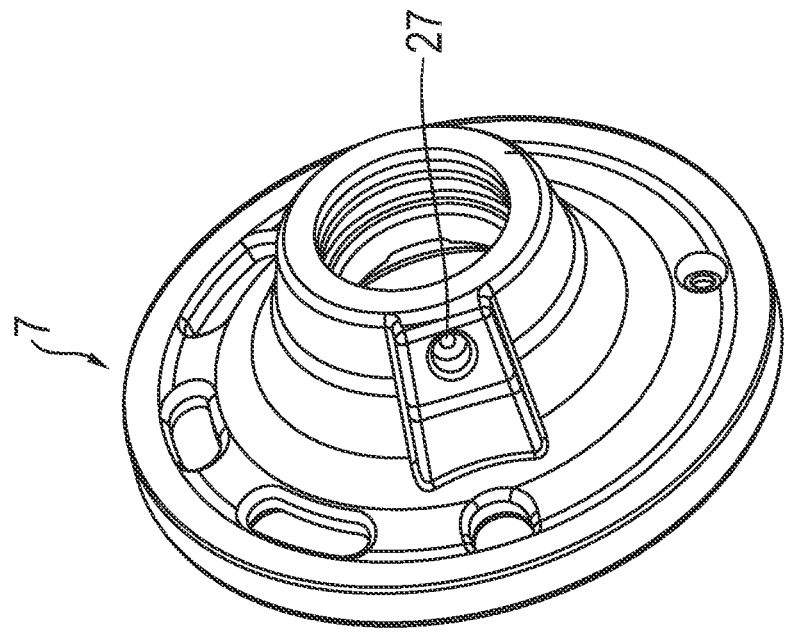
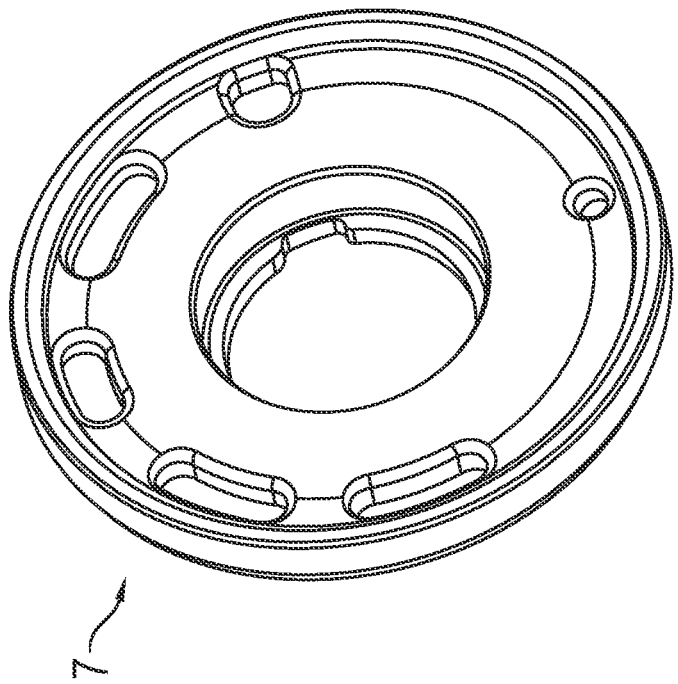
Fig. 11

DIFFERENTIAL OF A MOTOR VEHICLE

CROSS-REFERENCE TO RELATED APPLICATIONS

This application is a national stage of International Application No. PCT/EP2020/055673, filed Mar. 4, 2020, the disclosure of which is incorporated herein by reference in its entirety, and which claimed priority to German Patent Application No. 102019203015.7, filed Mar. 6, 2019, the disclosure of which is incorporated herein by reference in its entirety.

TECHNICAL FIELD

The disclosure relates to a differential of a motor vehicle, comprising a crown wheel and a differential casing connected thereto, comprising differential pinion gears arranged on differential pins, wherein the differential pins are connected to the differential casing, comprising a first differential side gear, which is mounted on a first drive shaft for conjoint rotation, and a second differential side gear, which is mounted on a second drive shaft for conjoint rotation, comprising a first plate stack, which is arranged axially with respect to the first drive shaft between the crown wheel and the first differential side gear, and a second plate stack, which is arranged axially with respect to the second drive shaft between the crown wheel and the differential casing.

BACKGROUND

In a differential of a motor vehicle, in the case of greater differences in rotational speed between two drive shafts, a basic locking torque occurs by pressing together two plate stacks. Additionally, an actuatable multi-plate lock comprising a third plate stack, which is actuated externally as required and by which the differential is locked, can be present, wherein the crown wheel or the differential casing are coupled non-positively to a drive shaft by the third plate stack.

What is needed is to provide a differential of a motor vehicle of the type mentioned above which in the case of a small component and constructional space requirement is also externally actuatable.

SUMMARY

According to the disclosure a force can be applied to one or both plate stacks by a switchable actuating device counter to the differential side gear associated with the respective plate stack.

In one exemplary arrangement, one plate stack of the differential is used, but alternatively, both plate stacks simultaneously may be used, for an externally actuatable lock. With this arrangement, a third plate stack is not necessary, resulting in a substantial reduction in the components and constructional space required.

Actuation of the actuating device can be carried out by any suitable application of force on the plate stack or the plate stacks.

In one exemplary arrangement, the actuating device is a hydraulic actuating device.

In one exemplary arrangement, a cylinder, which is coaxial to the respective drive shaft and which has an opening facing the plate stack associated therewith, can be configured to this end in the crown wheel and/or in the differential casing or a component fixedly connected thereto, wherein a piston is displaceably arranged in the cylinder and wherein a hydraulic pressure can be applied to the cylinder on the side of the piston remote from the plate stack and force can be applied to the piston with its side facing the plate stack counter to the plate stack.

So as not to collide with the drive shafts and yet to maintain a coaxial construction requiring a small constructional space, the cylinder can be an annular cylinder and the piston can be an annular piston.

In one exemplary arrangement, a first pressure line can lead from a switchable pressure source to the cylinder or annular cylinder on the side of the piston remote from the plate stack.

In one exemplary arrangement, one or more second pressure lines can connect the cylinder or annular cylinder associated with the one plate stack to the cylinder or annular cylinder associated with the other plate stack.

The above described arrangements make it possible to apply hydraulic pressure to the pistons of both plate stacks via a single pressure connection. Thus the constructional space requirement is reduced.

If at the same time the one or more second pressure lines are arranged in the differential casing, the required constructional space is reduced even further.

In order to avoid a weight eccentricity of the differential housing, in each case two second pressure lines can be arranged diametrically opposing one another in the differential casing.

If at the same time grooves, which are open toward the interior of the differential casing and in which the pressure lines are arranged, are configured in the differential casing, this results in the pressure lines being able to be mounted in a simple manner.

BRIEF DESCRIPTION OF THE DRAWINGS

An exemplary arrangement of the disclosure is shown in the drawing and is described in more detail hereinafter. In the drawing:

FIG. 4 shows a longitudinal section of a differential casing of the differential according to FIG. 1;

FIG. 5 shows a pressure line of the differential according to FIG. 1;

FIG. 6 shows two perspective front views of the differential casing of the differential according to FIG. 1;

FIG. 7 shows a detailed view of the left-hand side of the differential according to FIG. 3 with an enlarged view of an end of the pressure line according to FIG. 5 with a securing element;

FIG. 8 shows a detail of the left-hand side of the differential according to FIG. 1 in longitudinal section with a perspective view of components;

FIG. 9 shows a detail of the right-hand side of the differential according to FIG. 1 in longitudinal section;

FIG. 10 shows a perspective view of a closure cover of the differential according to FIG. 1; and FIG. 11 shows a perspective view of differential covers of the differential according to FIG. 1.

DETAILED DESCRIPTION

Figure 1:
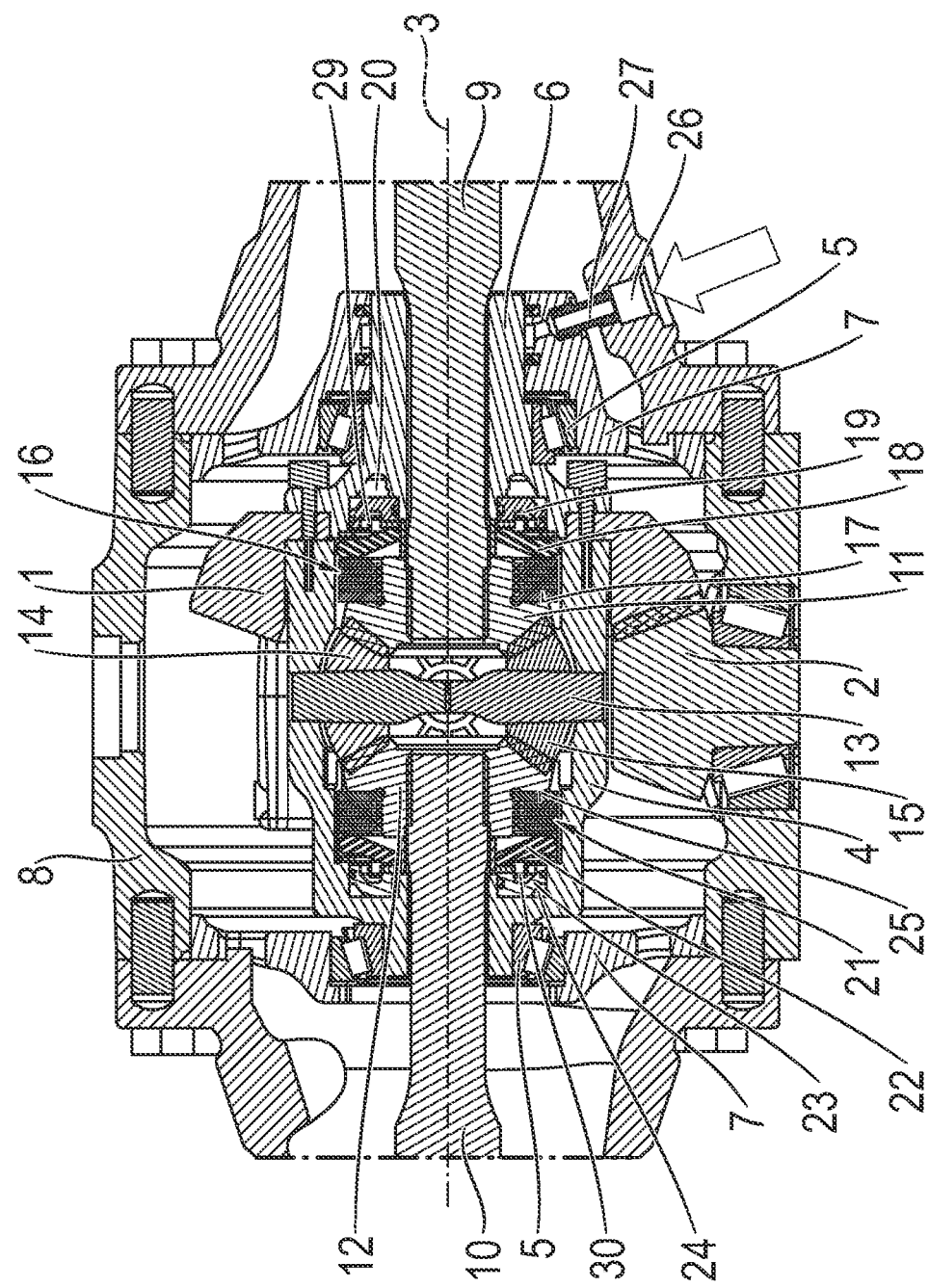
FIG. 1 shows a longitudinal section of a differential.

A self-locking differential of a motor vehicle, shown in the figures, has a crown wheel 1 which is rotatably driven about a rotational axis 3 via a drive pinion 2 by a drive machine of a motor vehicle, not shown.

Coaxially to the crown wheel 1, a pot-shaped differential casing 4 is fixedly connected to the crown wheel 1.

An opening of the pot-like differential casing 4 is closed by a closure cover 6 which is fixedly connected to the differential casing 4.

A structural unit of the differential casing 4 and the differential cover 6 is rotatably mounted via rolling bearings 5 in axial openings of the differential covers 7, wherein the differential covers 7 in turn are fixedly arranged in an axle bridge 8.

Two drive shafts 9 and 10 which in each case drive wheels of the motor vehicle, not shown, are arranged coaxially to one another and to the rotational axis 3. A first differential side gear 11 is fixedly arranged on the first drive shaft 9 and a second differential side gear 12 is fixedly arranged on the second drive shaft 10.

A differential pin 13 extending transversely to the rotational axis protrudes with its ends into corresponding recesses of the differential casing 4 and is fastened therein.

A first differential side gear 14 and a second differential side gear 15 are arranged opposing one another on the differential pin 13.

An annular first plate stack 16, which is supported with its one side via a first plate-like ring 18 on a first annular piston 19, is arranged in the interior of the differential casing 4 on the side of the closure cover 6, wherein the first annular piston 19 is axially guided in a first annular cylinder 20 which is configured in the closure cover 6.

The first plate stack 16 bears with its side remote from the closure cover 6 against a first bearing surface 17 of the first differential side gear 11.

An annular second plate stack 21, which is supported with its one side via a second plate-like ring 22 on a second annular piston 23, is arranged in the interior of the differential casing 4 on the side 6 remote from the closure cover 6, wherein the second annular piston 23 is axially guided in a second annular cylinder 24 which is configured in the bottom of the differential casing 4.

The second plate stack 21 bears with its side facing the closure cover 6 against a second bearing surface 25 of the second differential side gear 12.

The plate stacks 16 and 21 consist of inner plates and outer plates arranged alternately adjacent to one another, wherein the inner plates are connected via support teeth to the differential side gears 11 and 12, whilst the outer plates are supported in the differential casing 4.

A pressure connection 26 is configured in the axle bridge 8, a first pressure line 27 leading from said pressure connection into the first annular cylinder 20 on the side of the first annular piston 19 remote from the first plate stack 16.

A second pressure line 28 leads from the first annular cylinder 20 to the side of the second annular piston 23 remote from the second plate stack 21 into the second annular cylinder 24.

A first cage 29 is arranged between the first annular piston 19 and the first plate-like ring 18 and a second cage 30 is arranged between the second annular piston 23 and the second plate-like ring 22. The first plate-like ring 18 and the second plate-like ring 22 are held in their position by these cages 29 and 30 (see FIG. 9).

Figure 2:
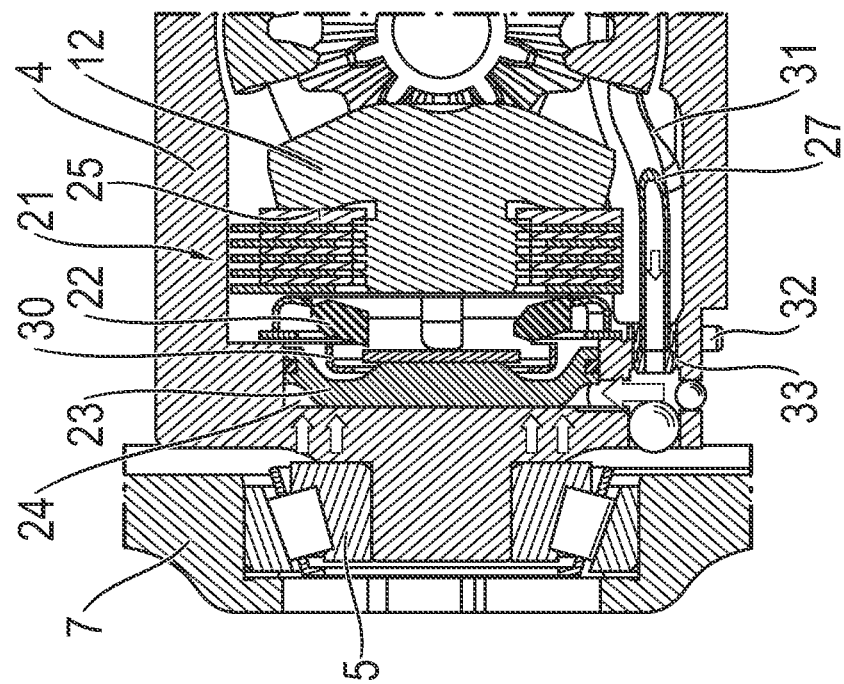
FIG. 2 shows a partial longitudinal section of the right-hand side of the differential according to FIG. 1.
Figure 3:
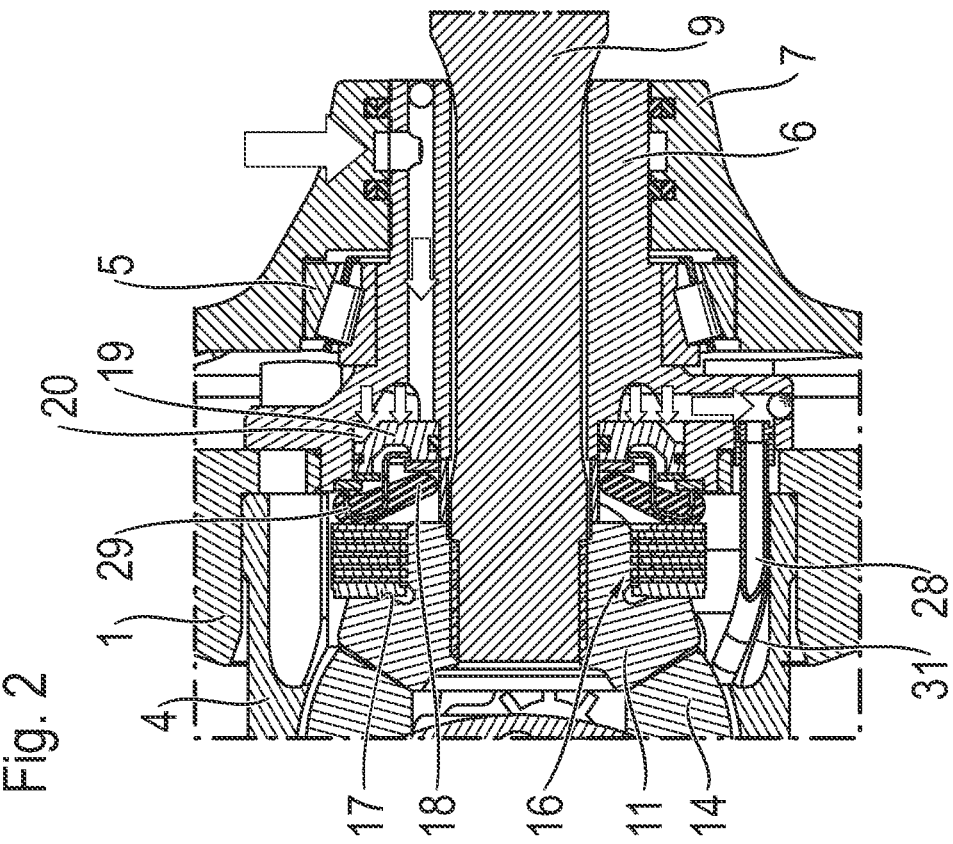
FIG. 3 shows a partial longitudinal section of the left-hand side of the differential according to FIG. 1.

If a hydraulic pressure is applied unto the annular cylinders 20 and 24 from a pressure source 37 of an actuating device 39, shown schematically in FIG. 9, via the pressure connection 26 and the pressure lines 27 and 28, the annular pistons 19 and 23 press the plate stacks 16 and 21 together and lock the differential (see FIGS. 2 and 3).

As FIGS. 4 to 6 show, two diametrically opposing grooves 31, which are open toward the interior of the differential casing 4 and in which two second pressure lines 28 are arranged, are configured in the inner wall of the differential casing 4.

FIG. 7 shows a detailed view of the left-hand side of the differential according to FIG. 3 with an enlarged view of an end of the second pressure line 28 according to FIG. 5 with a securing element. The end of the second pressure line 28 is inserted into a bore 33 leading into the second annular cylinder and has a radially circumferential securing groove 34. The securing element consists of a securing pin 32 which can be inserted into a transverse bore 35 which is tangential to the bore 33, such that the securing pin 32 engages in the securing groove 34 and holds the end of the second pressure line 28 in the installed position thereof.

The invention claimed is:

1. A differential of a motor vehicle, comprising:
a crown wheel and a differential casing connected thereto,
differential pinion gears arranged on differential pins, wherein the differential pins are connected to the differential casing,
a first differential side gear, which is mounted on a first drive shaft for conjoint rotation, and
a second differential side gear, which is mounted on a second drive shaft for conjoint rotation,
a first plate stack, which is arranged axially with respect to the first drive shaft between the crown wheel and the first differential side gear, and
a second plate stack, which is arranged axially with respect to the second drive shaft between the crown wheel and the differential casing,
wherein a cylinder, which is coaxial to the respective drive shaft and which has an opening facing the plate stack associated therewith, is configured in the crown wheel and/or the differential casing,
wherein a piston is displaceably arranged in the cylinder,
wherein one or more second pressure lines arranged in the differential connect the cylinder associated with the one plate stack to the cylinder associated with the other plate stack and wherein a hydraulic pressure can be applied to the cylinder on a side of the piston remote from the plate stack and force can be applied to the piston with a side facing the plate stack counter to the plate stack so as to apply force to one or both plate stacks by a switchable actuating device counter to the differential side gear associated with the particular plate stack.

2. The differential as claimed in claim 1, wherein the actuating device is a hydraulic actuating device.

3. The differential as claimed in claim 1, wherein the cylinder is an annular cylinder and the piston is an annular piston.

4. The differential as claimed claim 1, wherein a first pressure line leads from a switchable pressure source to the cylinder on the side of the piston remote from the plate stack.

5. The differential as claimed in claim 1, wherein two second pressure lines are arranged diametrically opposing one another in the differential casing.

6. The differential as claimed in claim 1, characterized in that grooves, which are open toward the interior of the differential casing and in which the second pressure lines are arranged, are configured in the differential casing.

7. The differential as claimed in claim 1, wherein the second pressure lines have at ends thereof plug connections which can be inserted into corresponding connection openings which are configured in the differential casing or the crown wheel and which lead to the cylinders.

8. A differential of a motor vehicle, comprising:
a crown wheel and a differential casing connected thereto,
differential pinion gears arranged on differential pins, wherein the differential pins are connected to the differential casing,
a first differential side gear, which is mounted on a first drive shaft for conjoint rotation, and
a second differential side gear, which is mounted on a second drive shaft for conjoint rotation,
a first plate stack, which is arranged axially with respect to the first drive shaft between the crown wheel and the first differential side gear, and
a second plate stack, which is arranged axially with respect to the second drive shaft between the crown wheel and the differential casing,
a first cylinder that is coaxial to the first drive shaft, the first cylinder has an opening facing the first plate stack and is configured in the differential casing,
a second cylinder that is coaxial to the second drive shaft, the second cylinder has an opening facing the second plate stack and is configured in the differential case,
a first piston displaceably arranged in the first cylinder and wherein a hydraulic pressure is applied to the first cylinder on a side of the first piston remote from the first plate stack; and
a first cage arranged between the first piston and a first ring;
wherein force can be applied to one or both plate stacks by a switchable actuating device counter to the differential side gear associated with the particular plate stack.

9. The differential as claimed in claim 8, wherein a second piston is displaceably arranged in the second cylinder and wherein a hydraulic pressure is applied to the second cylinder on a side of the second piston remote from the second plate stack and force can be applied to the second piston with a side facing the second plate stack counter to the second plate stack.

10. The differential as claimed in claim 8, wherein a first pressure line leads from a switchable pressure source to the first cylinder on the side of the first piston remote from the first plate stack.

11. The differential as claimed in claim 10, wherein a second pressure line leads from a switchable pressure source to the second cylinder on the side of the second piston remote from the second plate stack.

12. The differential as claimed in claim 8, wherein a first pressure line connects the first cylinder to the second cylinder.

13. The differential as claimed in claim 11, wherein two second pressure lines are provided, the second pressure lines being arranged diametrically opposing one another in grooves that are open toward the interior of the differential casing.

14. The differential as claimed in claim 13, wherein the second pressure lines have at ends thereof plug connections which can be inserted into corresponding connection openings which are configured in the differential casing.

15. The differential as claimed in claim 8, further comprising a second cage arranged between the second piston and a second ring.

* * * * *